(12) United States Patent
Gokhale et al.

(10) Patent No.: US 9,899,687 B2
(45) Date of Patent: Feb. 20, 2018

(54) PROCESS FOR THE SYNTHESIS OF NITROGEN-DOPED CARBON ELECTRO-CATALYST

(71) Applicant: Council of Scientific & Industrial Research, New Delhi (IN)

(72) Inventors: Rohan Gokhale, Pune (IN); Sreekuttan Maraveedu Unni, Pune (IN); Kurungot Sreekumar, Pune (IN); Satishchandra Balkrishna Ogale, Pune (IN)

(73) Assignee: COUNCIL OF SCIENTIFIC AND INDUSTRIAL RESEARCH (IN)

(*) Notice: Subject to any disclaimer, the term of this patent is extended or adjusted under 35 U.S.C. 154(b) by 15 days.

(21) Appl. No.: 14/915,978

(22) PCT Filed: Sep. 2, 2014

(86) PCT No.: PCT/IN2014/000572
§ 371 (c)(1),
(2) Date: Mar. 2, 2016

(87) PCT Pub. No.: WO2015/029076
PCT Pub. Date: Mar. 5, 2015

(65) Prior Publication Data
US 2016/0197357 A1    Jul. 7, 2016

(30) Foreign Application Priority Data
Sep. 2, 2013  (IN) .......................... 2593/DEL/2013

(51) Int. Cl.
*C01B 32/00*    (2017.01)
*H01M 4/90*    (2006.01)
*H01M 4/96*    (2006.01)

(52) U.S. Cl.
CPC .......... *H01M 4/9091* (2013.01); *C01B 32/00* (2017.08); *H01M 4/96* (2013.01)

(58) Field of Classification Search
None
See application file for complete search history.

(56) References Cited

U.S. PATENT DOCUMENTS

2011/0136036 A1* 6/2011 Miyata .................. H01G 11/34
429/479
2014/0291587 A1* 10/2014 Li ......................... H01G 11/34
252/503

FOREIGN PATENT DOCUMENTS

| JP | WO 2014087894 A1 * | 6/2014 | .......... H01M 4/9008 |
| JP | WO 2015080274 A1 * | 6/2015 | .............. B01J 21/18 |
| WO | 2013033847 A1 | 3/2013 | |

OTHER PUBLICATIONS

Mori et al.; WO Pub. No. 2014/087894 translation.*
Chen et al.; Biomass-derived Electrocatalytic Composites for Hydrogen Evolution; Energy Environ. Sci.; 6, 1818-1826; 2013.*
ISA / EPO, International Search Report and Written Opinion for PCT/IN2014/000572, dated Dec. 22, 2014.

(Continued)

*Primary Examiner* — Guinever S Gregorio
(74) *Attorney, Agent, or Firm* — McDonald Hopkins LLC

(57) ABSTRACT

The present invention discloses a process for the synthesis of nitrogen-doped carbon electrocatalyst with good electrochemical stability and fuel tolerance for oxygen reduction reaction (ORR) by pyrolysis of protein-rich pulse flour cooked with SiO2 nanoparticles.

9 Claims, 18 Drawing Sheets

(56) References Cited

OTHER PUBLICATIONS

Figure 1:
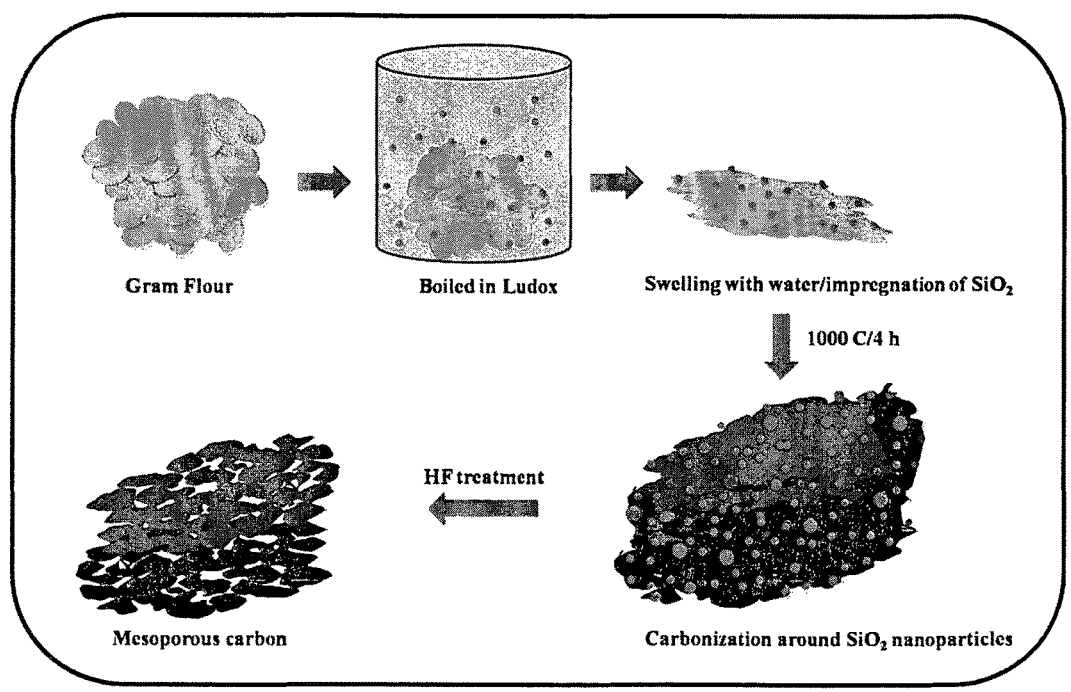

Mane, et al., "Preparation of Highly Ordered Nitrogen-Containing Mesoporous Carbon from a Gelatin Biomolecule and its Excellent Sensing of Acetic Acid," Advanced Functional Materials, Wiley—V C H Verlag GmbH & Co. KGAA, DE, vol. 22, No. 17, Sep. 11, 2012, pp. 3596-3601.

Lu, et al., "Nitrogen-Doped Ordered Mesoporous Carbons Synthesized from Honey as Metal-Free Catalyst for Oxygen Reduction Reaction," Electrochimica Acta, vol. 108, Jul. 1, 2013, pp. 10-16.

\* cited by examiner

PROCESS FOR THE SYNTHESIS OF NITROGEN-DOPED CARBON ELECTRO-CATALYST

This application is a 35 U.S.C. 371 national stage filing and claims priority to International Application No. PCT/IN2014/000572 filed on Sep. 2, 2014, entitled "Process for the Synthesis of Nitrogen-Doped Carbon Electro-Catalyst," which claims the benefit of Indian Patent Application No. 2593/DEL/2013 filed on Sep. 2, 2013, each of which are hereby incorporated herein by reference in their entirety.

FIELD OF THE INVENTION

The present invention relates to a process for the synthesis of nitrogen-doped carbon electro-catalyst for oxygen reduction reaction (ORR). More particularly, the present invention relates to a process for the synthesis of nitrogen-doped carbon electrocatalyst for oxygen reduction reaction by pyrolysis of protein-rich pulse flour cooked with $SiO_2$ nanoparticles.

BACKGROUND OF THE INVENTION

The emergence of fuel cell technology has created a new tool for the generation of clean, high efficiency alternative energy for humans. The research and development of new catalysts to replace the expensive and rare platinum (Pt) to reduce the overall cost of fuel cells is ongoing in this area. Nitrogen-doped carbon and its composites possess great potential for fuel cell catalyst applications especially at the oxygen reduction cathode. It is proposed that the reaction mechanisms of nitrogen-doped carbon catalysts for oxygen reduction involve adsorption of oxygen at the partially polarized carbon atoms adjacent to the nitrogen dopants, different from the mechanism at platinum catalysts, which utilize d-bands filling at oxygen adsorption sites. Nitrogen doping in both carbon nanostructures and its composites with active metals or ceramics are reviewed. Nitrogen-doped carbon without composite metals, displays high catalytic activity in alkaline fuel cells and exhibits significant activity in proton exchange membrane fuel cells and direct methanol fuel cells. Pt-based catalysts with nitrogen-doped carbon supports show enhanced catalytic activity towards oxygen reduction, attributed to the enhanced anchoring of Pt to the support that results in better dispersion and stability of the electrodes. For nitrogen-doped carbon composites with non-noble metals (Fe, Co, etc) enhanced activity is seen in both proton exchange and alkaline fuel cells.

The oxygen reduction reaction (ORR) in fuel cell is a critical step and indeed a limiting factor for the widespread application of low temperature PEMFC. Pt based electrocatalysts are the most extensively used materials in fuel cell cathodes due to the sluggish kinetics of ORR. However the high cost, poor durability and limited availability of platinum render the device with several cost and performance issues. It is with these concerns that intense research on the development of alternative electrocatalysts is being currently carried out. Materials like transition-metal containing macromolecules, metal oxides/nitrides/oxynitrides and their composites with carbon have been demonstrated as effective ORR catalysts but with performance and stability still much lower than platinum.

Amongst the various options under investigation, nitrogen doped carbon materials are perhaps the best performing, inexpensive, highly stable, environmentally-friendly, metal free alternatives to the Pt based systems. There are several reports on the ORR performance of N-doped carbon nanofibers, N-doped Carbon nanotubes (CNTs), N-doped graphene, N-doped mesoporous carbons etc. These materials have been synthesized by in-situ (addition of an organic compound in the precursor) or post-synthetic techniques (e.g. post synthetic annealing in $NH_3$ atmosphere etc.). Established synthetic routes towards such hetero-atom doped carbon systems include chemical vapor deposition, high temperature annealing, solvothermal synthesis, pyrolysis of organic compounds/polymers etc. In spite of much work in this area, most of these catalysts, including graphene based systems show ineffective catalytic performance and necessitate tedious synthetic protocols and expensive techniques/precursors, thereby restricting their applicability only to the small scale.

Recently, several interesting approaches have been adopted for the synthesis of highly effective doped carbon/composites as described below:

Article Titled "Biomass-derived activated carbon as high-performance non-precious electrocatalyst for oxygen reduction" by K Wang published in *RSC Adv.,* 2013, 3, pp 12039-12042 reports a new type of Fe and N doped carbon material is synthesized by pyrolyzing ferric chloride doped egg white (EW) and the proposed synthetic route is easy, green, and low-cost. In addition, the as-prepared sample exhibits a feasible magnetism and comparable oxygen reduction reaction (ORR) activity to commercial Pt/C.

Article Titled "Microwave-assisted rapid green synthesis of photoluminescent carbon nanodots from flour and their applications for sensitive and selective detection of mercury (II) ions" by X Qin et al. published in *Sensors and Actuators B: Chemical,* 31 Jul. 2013, Volume 184, Pages 156-162 reports the microwave-assisted rapid green synthesis of photoluminescent carbon nanodots (C-dots) with diameters in the range of 1-4 nm using flour as the carbon source. It suggests that the resultant C-dots exhibit high sensitivity and selectivity toward Hg2+ with a detection limit as low as 0.5 nM and a linear range of 0.0005-0.01 μM. The practical use of this system for Hg2+ determination in real lake water samples is also demonstrated successfully.

Article Titled "From biomass wastes to large-area, high-quality, N-doped graphene: catalyst-free carbonization of chitosan coatings on arbitrary substrates" by A Primo et al. published in *Chem Commun (Camb),* 2012 Sep. 25; 48(74): 9254-6 reports synthesis of N-doped graphene via pyrolysis of chitosan films under argon at 800° C. and under inert atmosphere gives rise to high-quality single layer N-doped graphene films (over 99% transmittance) as evidenced by XPS, Raman spectroscopy, and Transmission Electron Microscope (TEM) imaging.

Article Titled "One-step scalable preparation of N-doped nanoporous carbon as a high-performance electrocatalyst for the oxygen reduction reaction" by Z Liu et al. published in Nano Research, April 2013, Volume 6, Issue 4, pp 293-301 reports the N-doped porous carbon materials have been prepared by a simple one-step pyrolysis of ethylenediaminetetraacetic acid (EDTA) and melamine in the presence of KOH and $Co(NO_3)_2 \cdot 6H_2O$. The combination of the high specific area (1485 $m^2 \cdot g^{-1}$), high nitrogen content (10.8%) and suitable graphitic degree results in catalysts exhibiting high activity (with onset and half-wave potentials of 0.88 and 0.79 V vs the reversible hydrogen electrode (RHE), respectively) and four-electron selectivity for the oxygen reduction reaction (ORR) in alkaline medium—comparable to a commercial Pt/C catalyst, but far exceeding Pt/C in stability and durability. Owing to their superb ORR performance, low cost and facile preparation, the catalysts have great potential applications in fuel cells, metal-air batteries, and ORR-related electrochemical industries.

The most important challenge in fuel cells remains the synthesis of high-performance and cost-effective catalytic replacements for ORR that can be manufactured potentially on a large scale for a widespread deployment of fuel cell technology. The urgent need for sustainable energy development depends on the progress of green technologies, which have steered hot research areas into environmentally benign approaches via inexpensive precursors and abundant resources obtained directly from nature for energy devices such as fuel cells and supercapacitors.

OBJECTS OF THE INVENTION

The main object of the present invention is to provide a process for the synthesis of nitrogen-doped carbon electro-catalyst from food waste.

Another object of the present invention is to provide a process for the synthesis of nitrogen-doped carbon electro-catalyst for oxygen reduction reaction by pyrolysis of protein-rich pulse flour cooked with $SiO_2$ nanoparticles.

Yet another objective of the present invention is to provide a catalyst comprising mesoporous carbon having nitrogen doping in the range of 0.8 to 1.25%, wherein pore size of said electro-catalyst is in the range of 10 to 300 Å, surface area of said electro-catalyst is in the range of 600-800 $m^2/g$

SUMMARY OF THE INVENTION

Accordingly, the present invention provides a process for the synthesis of highly durable, fuel tolerant metal-free electro-catalyst nitrogen-doped carbon electrocatalyst for oxygen reduction reaction by pyrolysis of protein-rich pulse flour cooked with $SiO_2$ nanoparticles.

In an aspect, the present invention provides a facile strategy for the development of a high performance metal-free, nitrogen doped carbon electrocatalyst by a process involving silica templating through nanoparticle uptake followed by double pyrolysis of food waste with remarkable electrocatalytic activity towards ORR and high tolerance towards fuel like methanol with excellent electrochemical stability.

Another embodiment of the present invention provides a process for the synthesis of nitrogen-doped carbon electro-catalyst comprising the steps of:
  (a) boiling a protein rich precursor in excess of deionized (DI) water to obtain a slurry or in a colloidal silica nanoparticle dispersion in water, wherein said dispersion is boiled up to dryness to obtain a dried product;
  (b) filtering the slurry of step (a) through a Whatman filter paper to obtain a filtered product;
  (c) pyrolyzing the filtered product of step (b) or the dried product of step (a) to obtain a pyrolyzed product wherein the pyrolysis is carried out at 800-1100° C. for 2-4 hours;
  (d) treating the pyrolyzed product of step (c) with concentrated hydrofluoric acid [HF] to remove oxide impurities to obtain a porous carbon product; and
  (e) washing the porous carbon product of step (d) with deionized water by centrifugation and drying in oven followed by pyrolysis at 800-1100° C. for 2-4 hours to obtain the nitrogen-doped carbon electro-catalyst.

An embodiment of the present invention provides a process wherein the protein rich precursor of step (a) is selected from the group consisting of gram flour and soyabean.

Yet another embodiment of the present invention provides a process wherein pyrolysis is carried out in argon atmosphere.

Still another embodiment of the present invention provides a process wherein pyrolysis is carried out at 1000° C. for 4 hours.

Another embodiment of the present invention provides a process wherein pore size of the Whatman filter paper in step (b) is 0.2 µm.

An embodiment of the present invention provides a process wherein size of said colloidal silica nanoparticle is 12 nm.

Yet another embodiment of the present invention provides a process wherein the oxide impurity in step (d) is silica dioxide.

Still another embodiment of the present invention provides a nitrogen-doped carbon electro-catalyst comprising mesoporous carbon having nitrogen doping in the range of 0.8 to 1.25%, wherein pore size of said electro-catalyst is in the range of 10 to 300 Å, surface area of said electro-catalyst is in the range of 600-800 $m^2/g$.

An embodiment of the present invention provides a nitrogen-doped carbon electro-catalyst for use in oxygen reduction reaction.

BRIEF DESCRIPTION OF ACCOMPANYING DRAWINGS

FIG. 1. Diagrammatic representation of the synthesis protocol

Figure 2:
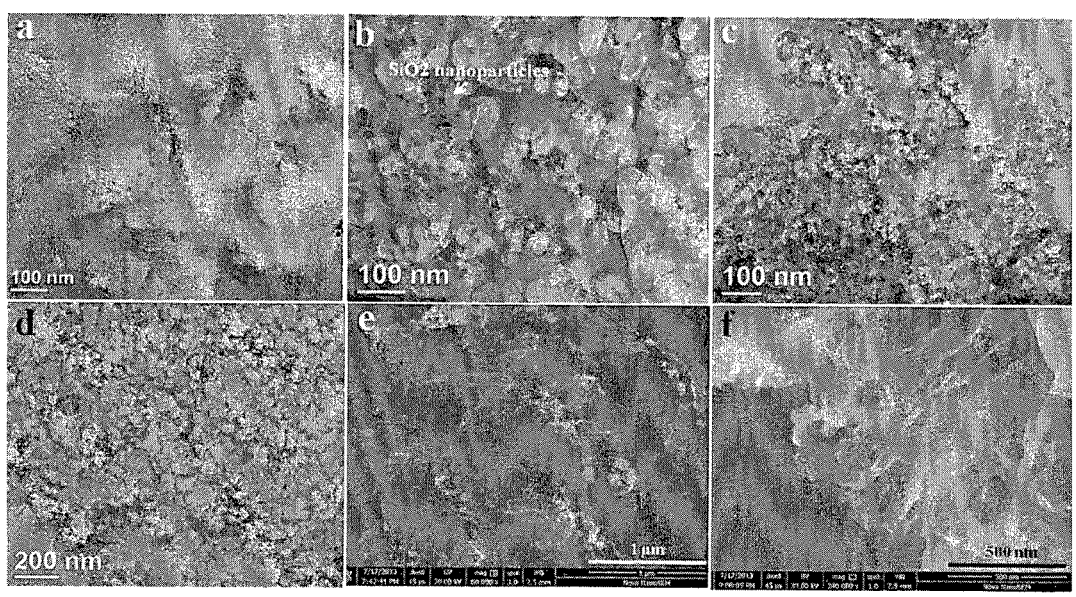

FIG. 2. *a*) TEM image of pure gram flour powder boiled in water, *b*) TEM image of $SiO_2$ nanoparticle uptake in the expanded gram flour matrix, *c, d*) Nitrogen doped mesoporous carbon (GFMC3); the best performing catalyst, *e*) SEM image of the porous carbon (GFMC3, *f*) FE-SEM image of GFMC3 at higher resolution showing the sheet-like graphitic morphology.

Figure 3:
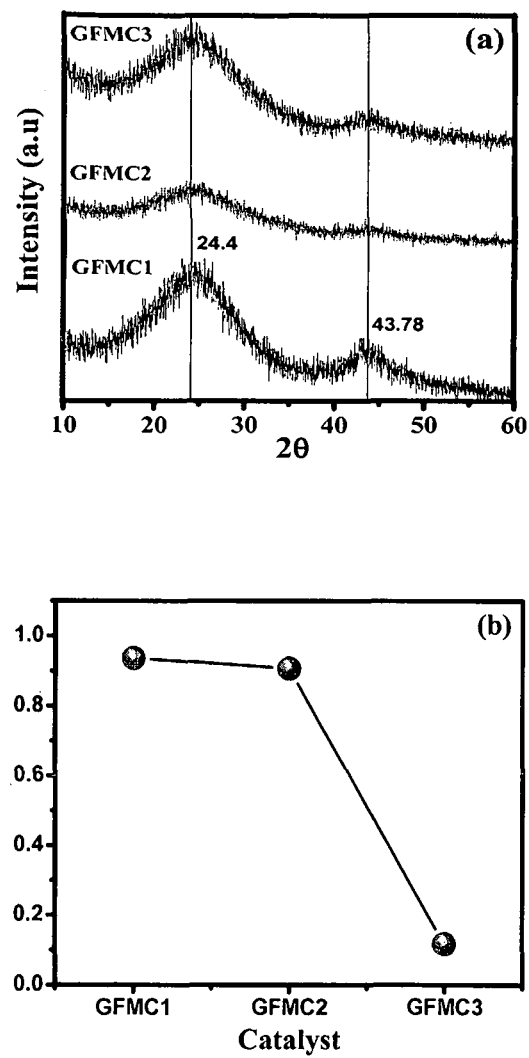
Figure 4:
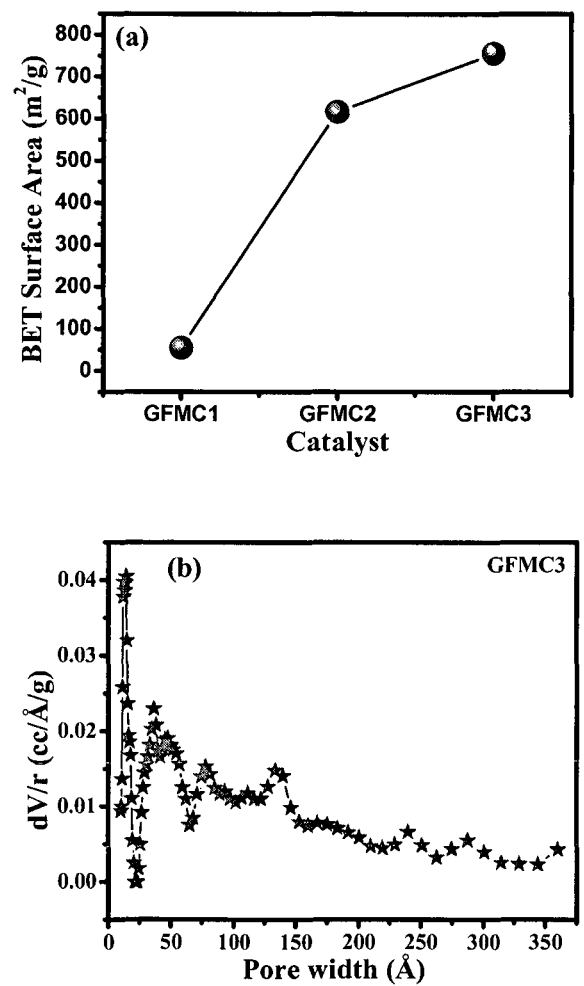

FIG. 3. *a*) XRD patterns of the food waste derived carbon catalysts *b*) Resistance measurement of 50 mg pellet at a pressure of 1 tonne of the carbon catalysts FIG. 4. *a*) BET surface area of the GFMC catalysts *b*) Pore-size distribution of the high surface area GFMC3

Figure 5:
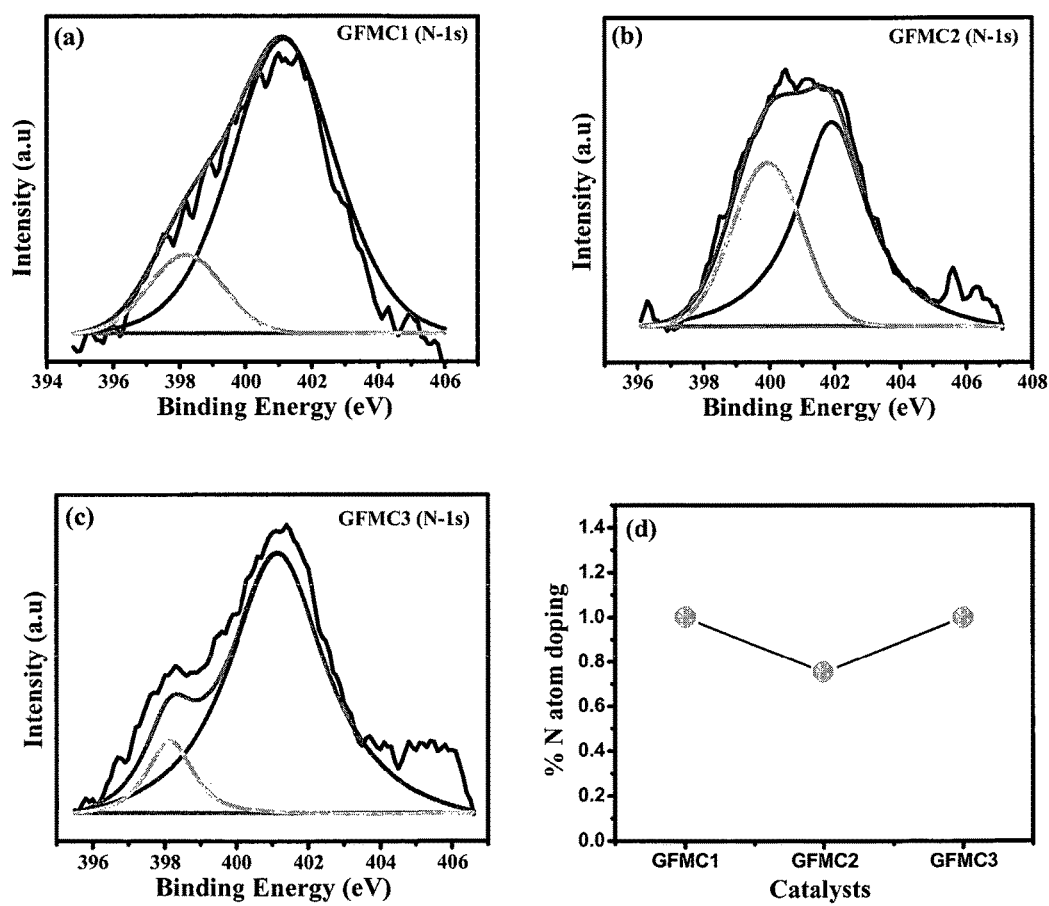
Figure 6:
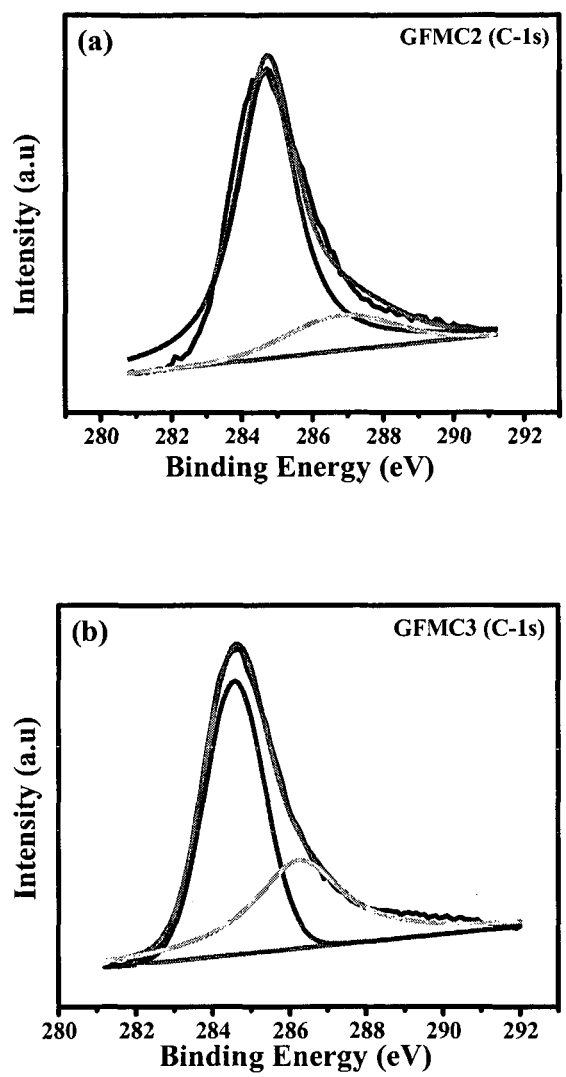

FIG. 5. (*a,b,c*) N1 s XPS spectra of GFMC1, GFMC2, GFMC3 respectively *d*) N atom doping percentage FIG. 6. C1s XPS spectra of *a*) GFMC2 *b*) GFMC3

Figure 7:
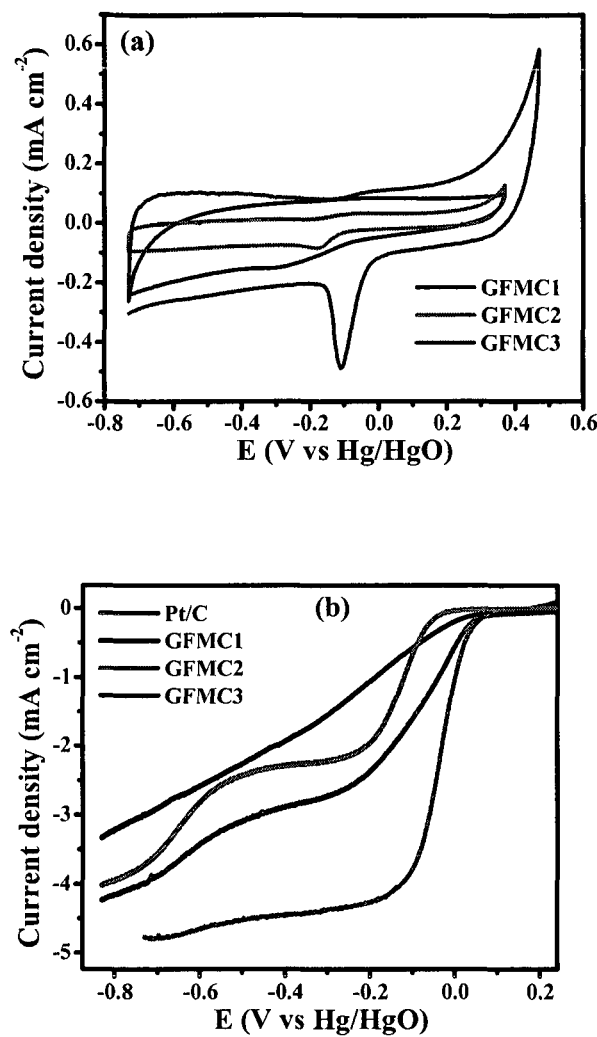

FIG. 7. *a*) Cyclic Voltammogram of GFMCs in 0.1 M KOH at 5 mV $s^{-1}$ scan rate *b*) LSV studies of the GFMC catalysts in 0.1 M oxygen saturated KOH with an electrode rotation of 1600 rpm and scan rate is 5 mV $s^{-1}$. For both experiments, reference electrode is Hg/HgO and graphite rode as counter electrode.

Figure 8:
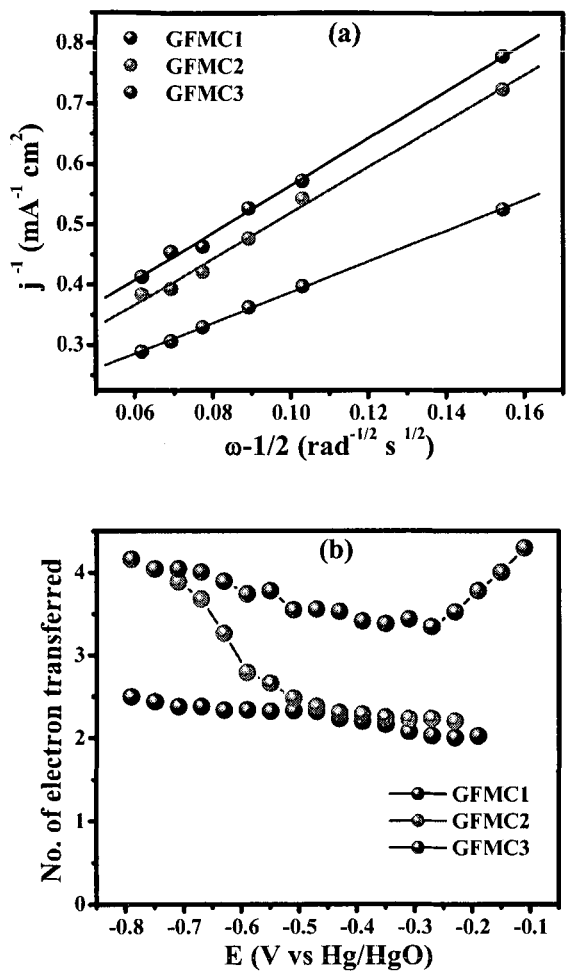

FIG. 8. *a*) K-L plots of the GFMCs at a potential of 0.47 V vs Hg/HgO. Plots are derived from the LSV at different rotation speed. *b*) Number of electron transfer calculated from the slope of K-L plot.

Figure 9:
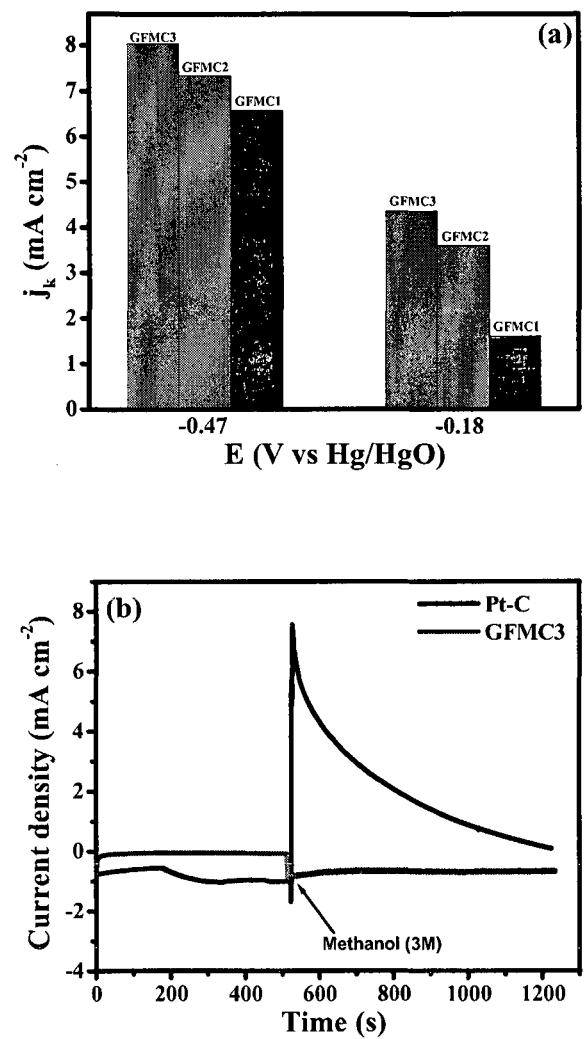

FIG. 9. *a*) Kinetic current density of the GFMCs Calculated from the slope of K-L plot *b*) Methanol Tolerance studies of GFMC3 at a rotation speed of 1000 rpm in oxygen saturated 0.1 M KOH. At 500 s, 3M methanol was added in to the electrolyte in order to evaluate the cross over effect.

Figure 10:
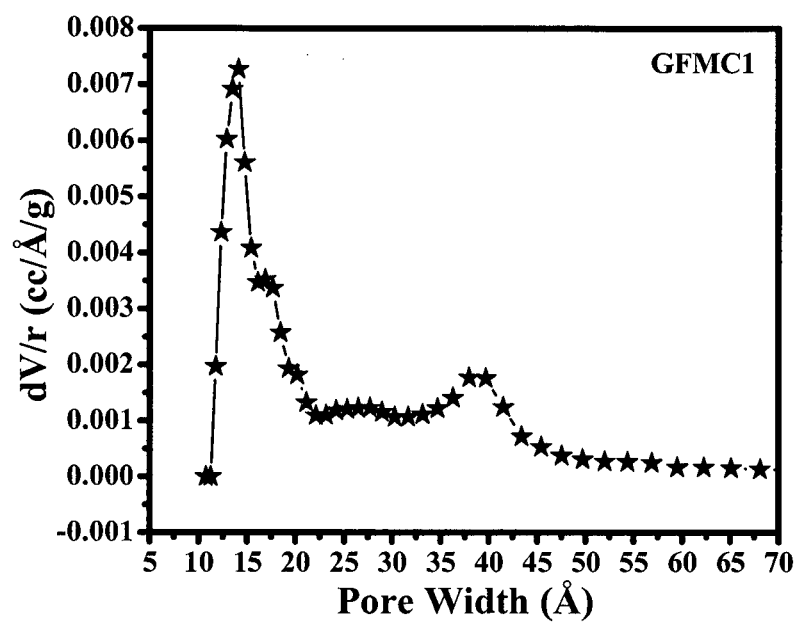

FIG. 10. Pore size distribution of GFMC1

Figure 11:
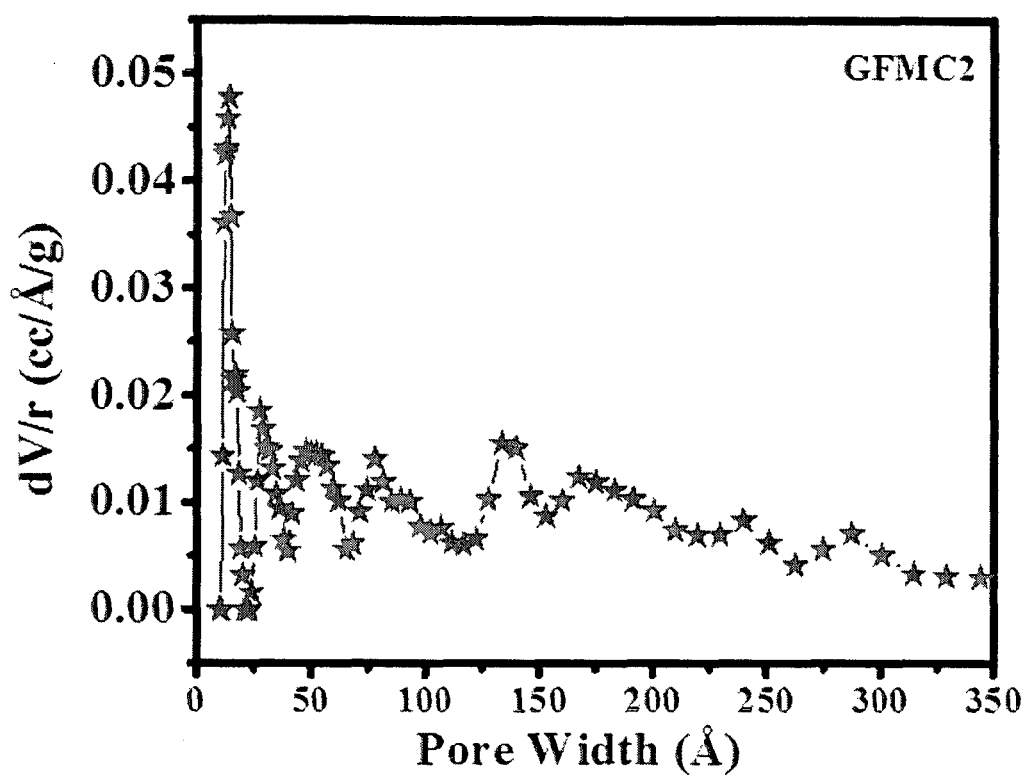

FIG. 11. Pore size distribution of GFMC2

Figure 12:
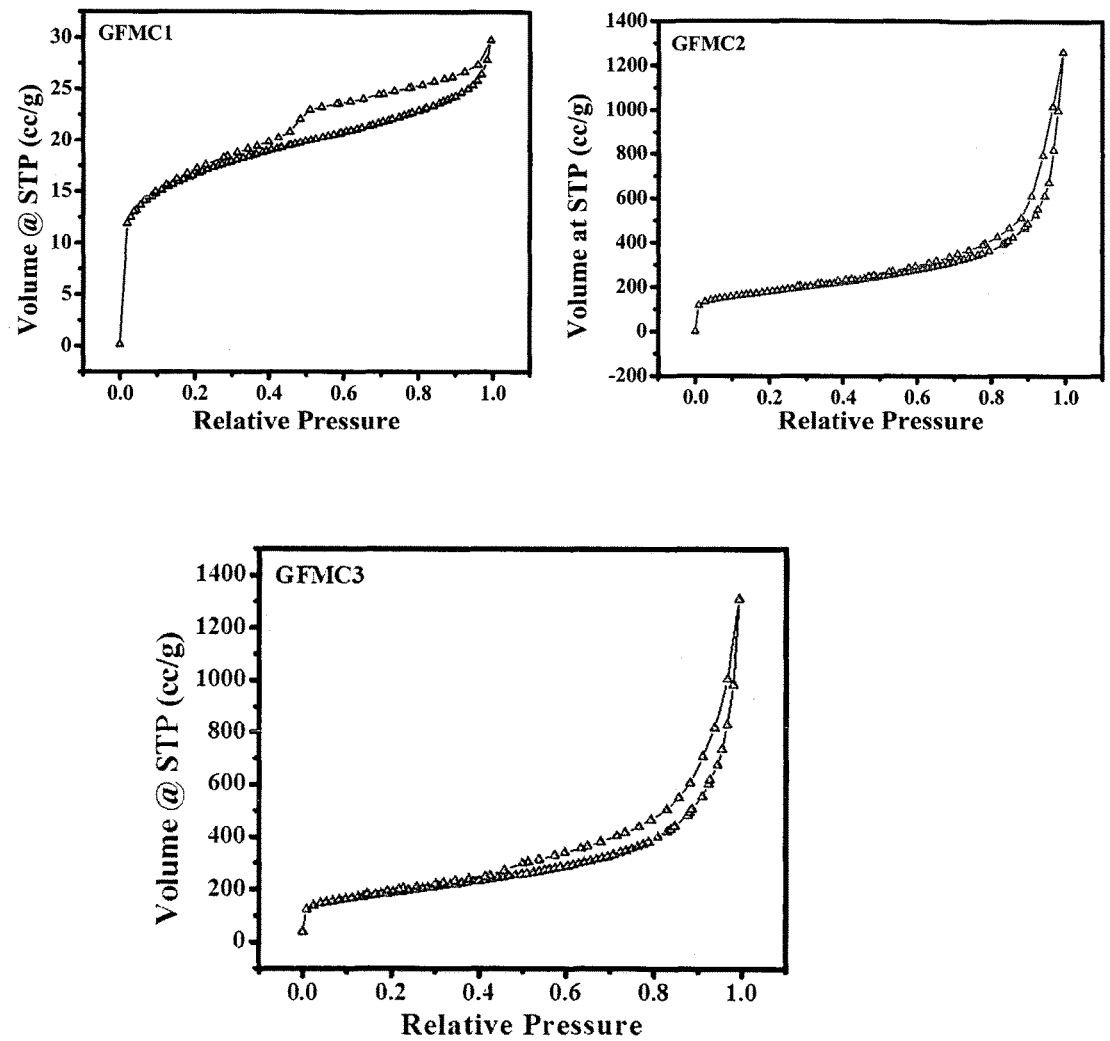

FIG. 12. Adsorption isotherms for GFMCs

Figure 13:
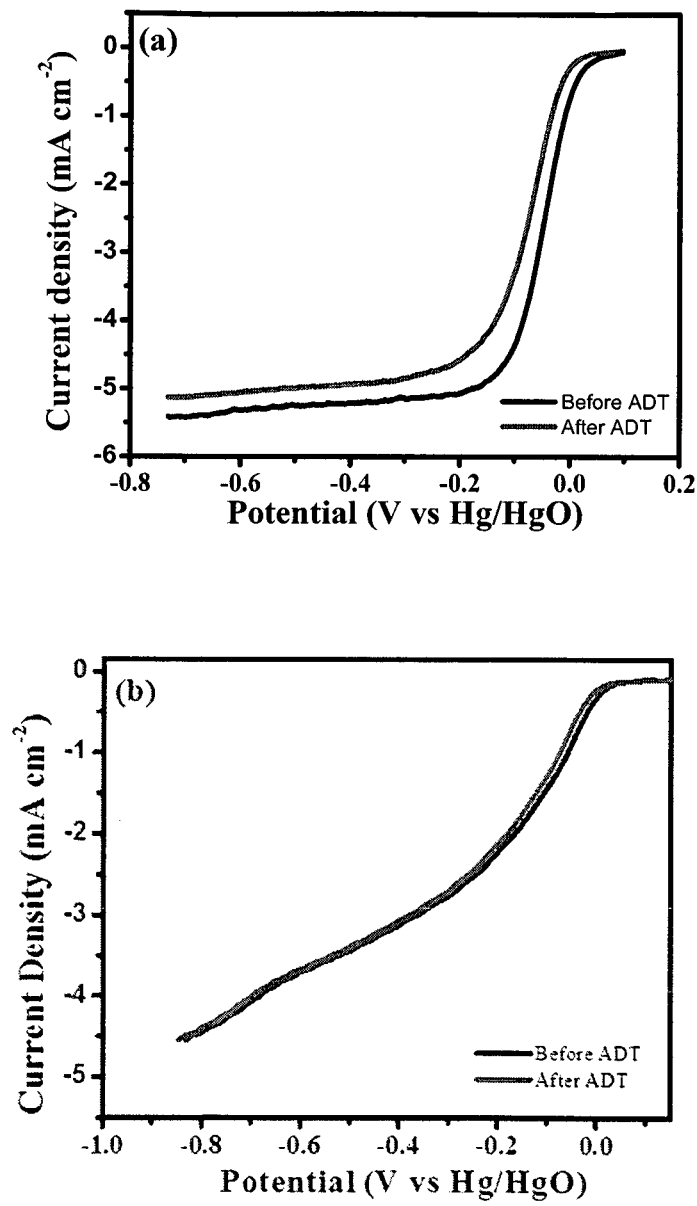

FIG. 13. *a*) Durability of Pt/C catalyst *b*) Durability of GFMC3

Figure 14:
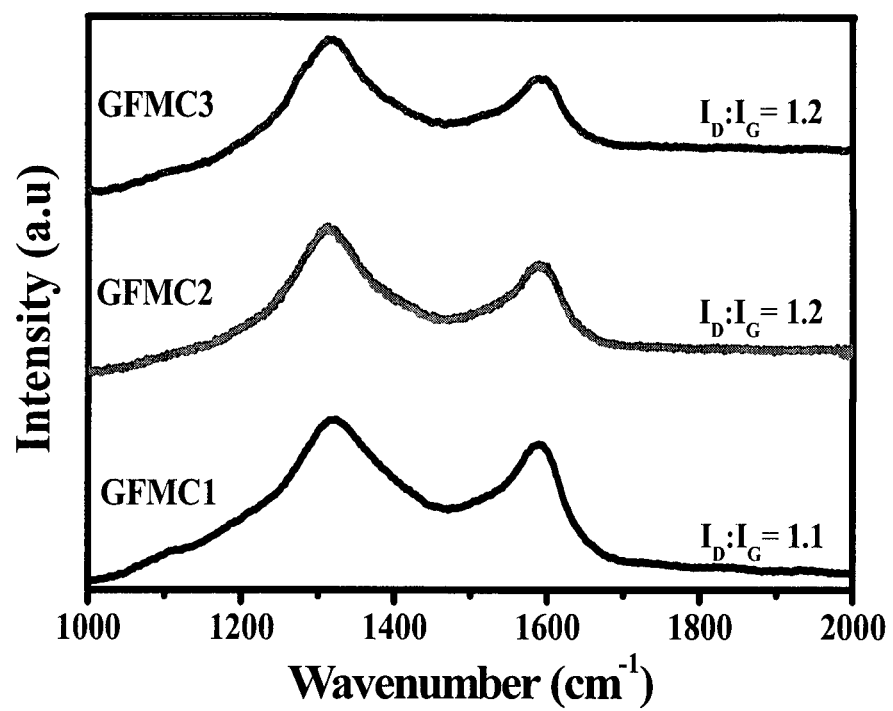

FIG. 14. Raman Spectroscopy of GFMCs

Figure 15:
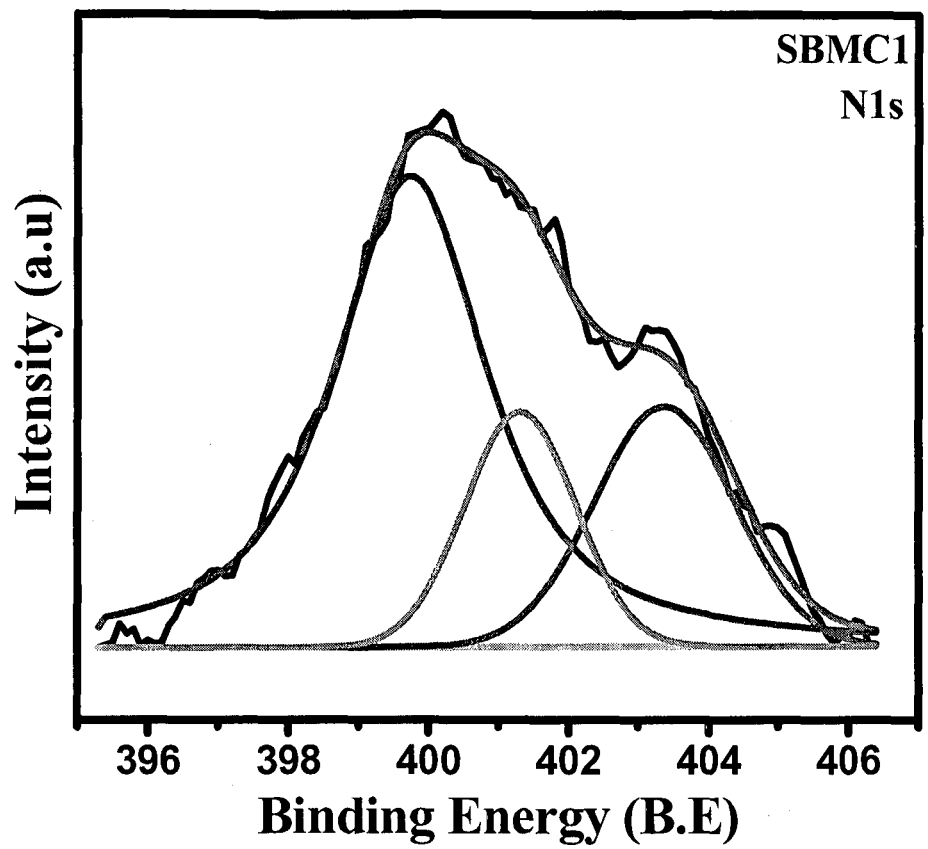

FIG. 15. XPS analysis of N1s in SBMC1

Figure 16:
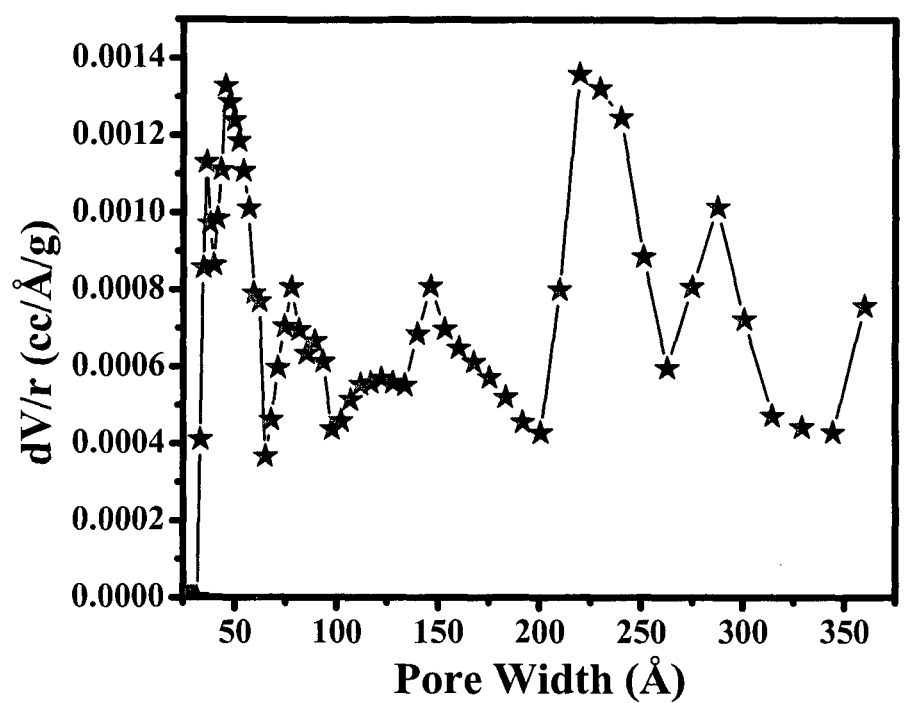

FIG. 16. Pore size distribution of SBMC1

Figure 17:
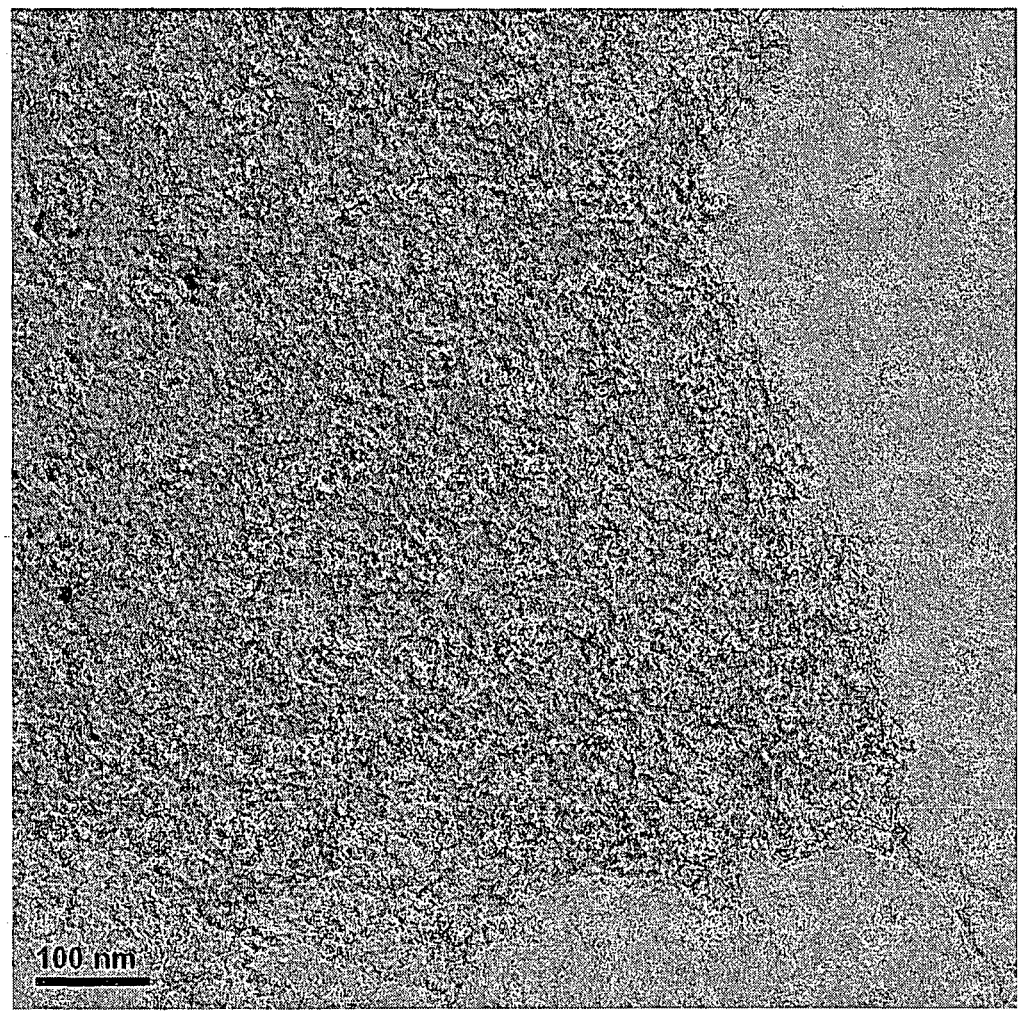

FIG. 17. TEM image of SBMC1

Figure 18:
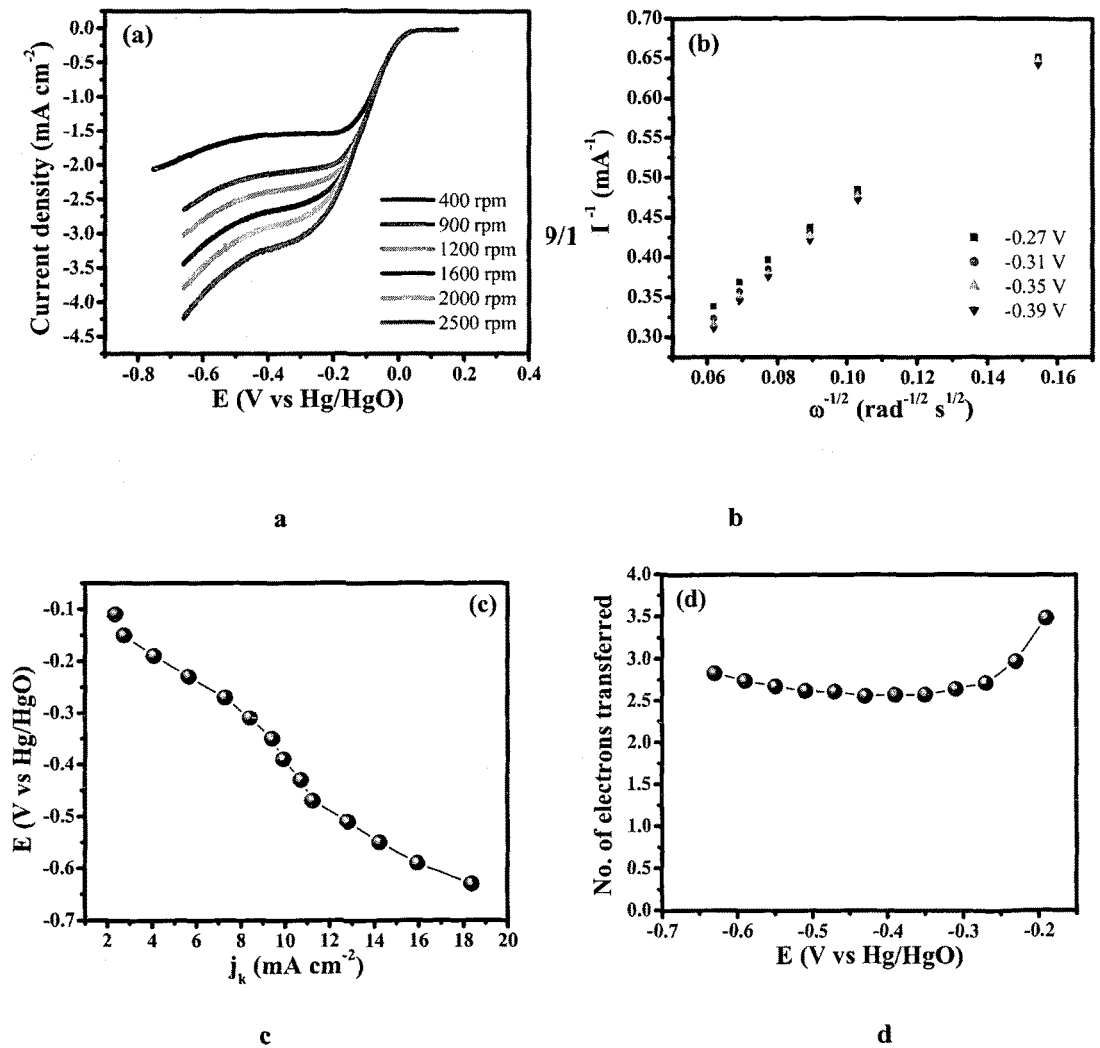

FIG. 18. a) LSV at different rotations b) KL plot for SBMC1 c) Kinetic current density plots d) No. of electrons transferred

DETAILED DESCRIPTION OF THE INVENTION

The invention will now be described in detail in connection with certain preferred and optional embodiments, so that various aspects thereof may be more fully understood and appreciated.

In an embodiment, the present invention provides a process for synthesis of a high performance metal-free, nitrogen doped carbon electrocatalyst by a process involving silica templating through nanoparticle uptake followed by double pyrolysis of food waste with remarkable electrocatalytic activity towards ORR and high tolerance towards fuel like methanol with excellent electrochemical stability.

In a preferred embodiment, the present invention provides a process for the synthesis of nitrogen-doped carbon electrocatalyst from food waste comprising the steps of:
- (a) boiling a protein rich precursor in excess of deionized (DI) water to obtain a slurry or in a colloidal silica nanoparticle dispersion in water, wherein said dispersion is boiled up to dryness to obtain a dried product;
- (b) filtering the slurry of step (a) through a Whatman filter paper to obtain a filtered product;
- (c) pyrolyzing the filtered product of step (b) or the dried product of step (a) to obtain a pyrolyzed product wherein the pyrolysis is carried out, at 800-1100° C. for 2-4 hours;
- (d) treating the pyrolyzed product of step (c) with concentrated hydrofluoric acid [HF] to remove oxide impurities to obtain a porous carbon product; and
- (e) washing the porous carbon product of step (d) with deionized water by centrifugation and drying in oven followed by pyrolysis at 800-1100° C. for 2-4 hours to obtain the nitrogen-doped carbon electro-catalyst.

The present invention provide a process for the synthesis of nitrogen-doped carbon electro-catalyst from food waste wherein the food waste is protein rich precursors preferably protein enriched pulse grains.

In an embodiment, the protein rich precursors may be selected from, but not limited to
1. Dry beans (*Phaseolus* spp. including several species now in *Vigna*)
    Kidney bean, haricot bean, pinto bean, navy bean (*Phaseolus vulgaris*)
    Lima bean, butter bean (*Phaseolus lunatus*)
    Azuki bean, adzuki bean (*Vigna angularis*)
    Mung bean, golden gram, green gram (*Vigna radiata*)
    Black gram, urad (*Vigna mungo*)
    Scarlet runner bean (*Phaseolus coccineus*)
    Ricebean (*Vigna umbellata*)
    Moth bean (*Vigna aconitifolia*)
    Tepary bean (*Phaseolus acutifolius*)
2. Dry broad beans (*Vicia faba*)
    Horse bean (*Vicia faba equina*)
    Broad bean (*Vicia faba*)
    Field bean (*Vicia faba*)
3. Dry peas (*Pisum* spp.)
    Garden pea (*Pisum sativum* var. *sativum*)
    Protein pea (*Pisum sativum* var. *arvense*)
4. Chickpea, garbanzo, Bengal gram (*Cicer arietinum*)
5. Dry cowpea, black-eyed pea, blackeye bean (*Vigna unguiculata*)
6. Pigeon pea, Arhar/Toor, cajan pea, Congo bean, gandules (*Cajanus cajan*)
7. Lentil (*Lens culinaris*)
8. Bambara groundnut, earth pea (*Vigna subterranea*)
9. Vetch, common vetch (*Vicia sativa*)
10. Lupins (*Lupinus* spp.)
11. Minor pulses, including:
    Lablab, hyacinth bean (*Lablab purpureus*)
    Jack bean (*Canavalia ensiformis*), sword bean (*Canavalia gladiata*)
    Winged bean (*Psophocarpus teragonolobus*)
    Velvet bean, cowitch (*Mucuna pruriens* var. *utilis*)
    Yam bean (*Pachyrrizus erosus*)

In a preferred embodiment, the protein rich precursors are gram flour or soyabean.

The present invention provides a process for the synthesis of nitrogen-doped carbon electro-catalyst from food waste.

The present invention provides a process for the synthesis of nitrogen-doped carbon electro-catalyst from food waste, wherein the said carbon catalyst is porous with pore size in the range of 10 to 300 Å.

The onset potential of the electrocatalyst prepared by the process described herein was determined against Hg/HgO electrode and the results are: (GFMC1—0.0598, GFMC2—0.0059, GFMC3—0.0871, SBMC1—0.0583, Pt/C—0.07 (V).

In an embodiment, the heteroatom in the electrocatalyst is ~1% doping, the resistance is 1-10 ohms for a 50 gm pellet at a pressure of 1 ton, the $O_2$ functionality (10-20%) and the surface area of the catalyst is in the range of 600-800 $m^2/g$. The durability, methanol stability and limiting current density of the catalyst are represented in the Figures.

EXAMPLES

The following examples, which include preferred embodiments, will serve to illustrate the practice of this invention, it being understood that the particulars shown are by way of example and for purpose of illustrative discussion of preferred embodiments of the invention.

Materials and Instrumentation

Gram flour and Soyabean grains were obtained commercially and were grounded to a fine powder. Ludox [Colloidal silica nanoparticle (size ~12 nm) dispersion in water] and conc. hydrofluoric acid (HF) was obtained from Sigma Aldrich. Split tube furnace with alumina tube and argon atmosphere was used for the pyrolysis process.

Three carbon samples were prepared from gram flour powder. The samples were named as gram flour-derived mesoporous carbon (GFMC) and Soyabean-derived mesoporous carbon (SBMC).

Example 1

Preparation of Gram Flour-Derived Mesoporous Carbon (GFMC1)

5 gm gram flour was boiled in excess deionized (DI) water for 5 hours. The slurry was filtered through a Whatman filter paper of pore size 0.2 μm. The filtered product was pyrolyzed at 1000° C./4 hrs in flowing argon atmosphere. The sample was then treated with conc. HF solution to remove oxide impurities. The product was washed with DI water by centrifugation several times and then dried in oven. The dried sample was again treated at 1000° C./4 hrs in argon atmosphere. This sample was then characterized.

Example 2

Preparation of Gram Flour-Derived Mesoporous Carbon (GFMC2)

5 gm gram flour was boiled for 5 hours in 50 ml Ludox solution up to dryness. The $SiO_2$-Gram flour slurry obtained was pyrolyzed in argon atmosphere at 1000° C. in a split tube for 4 hours. The obtained product was treated with conc. HF to remove silica nanoparticles and generate porous carbon. The carbon was recovered and washed with DI water by centrifugation several times. It was dried overnight in an oven and then re-heated at 1000° C. for 4 hrs in argon atmosphere. The final material was used for characterization.

Example 3

Preparation of Gram Flour-Derived Mesoporous Carbon (GFMC3)

5 gm gram flour was boiled for 5 hours in 200 ml Ludox solution up to dryness. The $SiO_2$-Gram flour slurry obtained was pyrolyzed in argon atmosphere at 1000° C. in a split tube for 4 hours. The obtained product was treated with conc. HF to remove silica nanoparticles and generate porous carbon. The carbon was recovered and washed with DI water by centrifugation several times. It was dried overnight in an oven and then re-heated at 1000° C. for 4 hrs in argon atmosphere. The final material was used for characterization.

Example 4

Preparation of Soyabean-Derived Mesoporous Carbon (SBMC1)

5 gm soyabean powder was boiled for 5 hours in 50 ml Ludox solution up to dryness. The $SiO_2$-Gram flour slurry obtained was pyrolyzed in argon atmosphere at 1000° C. in a split tube for 4 hours. The obtained product was treated with conc. HF to remove silica nanoparticles and generate porous carbon. The carbon was recovered and washed with DI water by centrifugation several times. It was dried overnight in an oven and then re heated at 1000° C. for 4 hrs in argon atmosphere. The final material was used for characterization.

These four cases of mesoporous carbon materials (GFMC1, GFMC2, GFMC3 and SBMC1) are characterized fully for their physical properties and also tested for electrocatalytic performance in ORR. The figurative description of the general synthesis protocol is shown in FIG. 1.

Results
Characterizations

Field Emission Scanning Electron Microscopy (FESEM, Nova NanoSEM 450) and High Resolution-Transmission Electron Microscopy (HR-TEM, FEI Tecnai 300) were used. The surface area of carbon was obtained from BET surface area measurements (Quantachrome Quadrasorb automatic volumetric instrument). X-ray photoelectron spectroscopy (XPS) (ESCA-3000, VG Scientific Ltd. UK, with a 9 channeltron CLAM4 analyzer under vacuum better than $1*10^{-8}$ Torr, Al Ka radiation (1486.6 eV) and a constant pass energy of 50 eV) was employed to study the chemical state of carbon in the materials respectively. X-ray Diffraction (XRD, Philips X'Pert PRO) and Raman spectroscopy (a confocal micro-Raman spectrometer LabRAM ARAMIS Horiba JobinYvon, with laser excitation wavelength of 612 nm) was also used.

Resistance Measurement 50 mg of carbon powder in each case is placed in a die and a pressure of 1 tonne is applied. The contact is made from both the sides of the die, and the top and bottom parts of the die are separated by a flexible insulator to avoid contact. Under pressure, the resistance is measured.

Adsorption Isotherms for GFMCs

All the samples were measured by nitrogen adsorption-desorption experiments at 77 K. All the adsorption isotherms are of type II with typical hysteris loop at high value of $p/p^0$. Hysteresis loop at high value of $p/p^0$ signifies microporosity in these materials.

Atomic Percentages for GFMCs

TABLE 1

| Atomic Percentages for the GMFCs | | | |
|---|---|---|---|
| Material | C | N | O |
| GMFC1 | 73.26 | 1 | 25.73 |
| GMFC2 | 84.77 | 0.75 | 14.47 |
| GMFC3 | 88.81 | 1 | 10.23 |

Raman Spectroscopy

Raman spectroscopy of the GFMCs reveal the characteristic D band of carbon at 1315 $cm^{-1}$ and G band due to $sp^2$ carbon 1590 $cm^{-1}$. The $I_D:I_G$ ratio shows an expected increase in the porous GFMC2 and GFMC3 as compared to GFMC1 due to the increase in number of defects in the systems.

SBMC1 as an Electrocatalyst for ORR

XPS analysis shows that SBMC1 contains Carbon, Nitrogen and Oxygen in the % ratio of 22:1.25:80. Very high oxygen content is observed in this material. A slightly greater % N atom doping (1.25%) is seen in SBMC1. This may be due to increased protein content of the precursor. The nitrogen content shows peaks at 399.7 eV (pyrrolic N), 401.3 eV (graphitic N) and 4033 eV (oxygenated N) (FIG. 5)

The pore size distribution of SBMC1 shows a similar hierarchical pore distribution which is responsible for enhanced catalytic activity (FIG. S6). The BET surface area of SBMC1 however is low (28 $m^2/g$).

This could be due to insufficient penetration of $SiO_2$ nanoparticles into the seed coat of soybean grains during the synthesis. The resistance of SBMC1 pellet also shows an increase as compared to GFMCs (~10.23 ohms). However the good performance in ORR in this case can be attributed to an increased nitrogen doping percentage and oxygen functionalization as compared to GFMCs. It is quite clear that SBMC1 possesses large number of catalytic sites in spite of having lesser surface area and conductivity as compared to GFMC2.

Advantages of the Present Invention a. Process is facile and does not involve tedious or cost effective procedures.
b. The precursors used are inexpensive.
c. The heteroatom doped carbon synthesized from these protein enriched precursors (the nitrogen constitution of the proteins contribute to the doping process) require no in-situ/ex-situ addition of any dopant.

d. The new catalyst provides remarkable performance and hence offers a practical alternative to Platinum based materials.

ABBREVIATIONS

ORR—oxygen reduction reaction
PEMFC—polymer electrolyte membrane fuel cell
GMFC—gram flour-derived mesoporous carbon
SBFC—Soyabean-derived mesoporous carbon

We claim:

1. A process for the synthesis of nitrogen-doped carbon electro-catalyst, the process comprising the steps of:
   (a) boiling a protein rich precursor in excess of deionized (DI) water to obtain a slurry or in a colloidal silica nanoparticle dispersion in water, wherein said dispersion is boiled up to dryness to obtain a dried product;
   (b) filtering the slurry of step (a) through a Whatman filter paper to obtain a filtered product;
   (c) pyrolyzing the filtered product of step (b) or the dried product of step (a) to obtain a pyrolyzed product wherein the pyrolysis is carried out at 800-1100° C. for 2-4 hours;
   (d) treating the pyrolyzed product of step (c) with concentrated hydrofluoric acid [HF] to remove oxide impurities to obtain a porous carbon product; and
   (e) washing the porous carbon product of step (d) with deionized water by centrifugation and drying in oven followed by pyrolysis at 800-1100° C. for 2-4 hours to obtain the nitrogen-doped carbon electro-catalyst having nitrogen doping in the range of 0.8 to 1.25%, wherein pore size of said electro-catalyst is in the range of 10 to 300 Å, surface area of said electro-catalyst is in the range of 600-800 $m^2/g$.

2. The process as claimed in claim 1, wherein the protein rich precursor of step (a) is selected from the group consisting of gram flour and soyabean.

3. The process as claimed in claim 1, wherein size of said colloidal silica nanoparticle is 12 nm.

4. The process as claimed in claim 1, wherein the pyrolysis is carried out in argon atmosphere.

5. The process as claimed in claim 1, wherein the pyrolysis is carried out at 1000° C. for 4 hours.

6. The process as claimed in claim 1, wherein pore size of the Whatman filter paper in step (b) is 0.2 μm.

7. The process as claimed in claim 1, wherein the oxide impurity is silica dioxide.

8. A nitrogen-doped carbon electro-catalyst comprising mesoporous carbon having nitrogen doping in the range of 0.8 to 1.25%, wherein pore size of said electro-catalyst is in the range of 10 to 300 Å, surface area of said electro-catalyst is in the range of 600-800 $m^2/g$.

9. A method of using the nitrogen-doped carbon electro-catalyst as claimed in 8 in an oxygen reduction reaction.

* * * * *